UNITED STATES PATENT OFFICE.

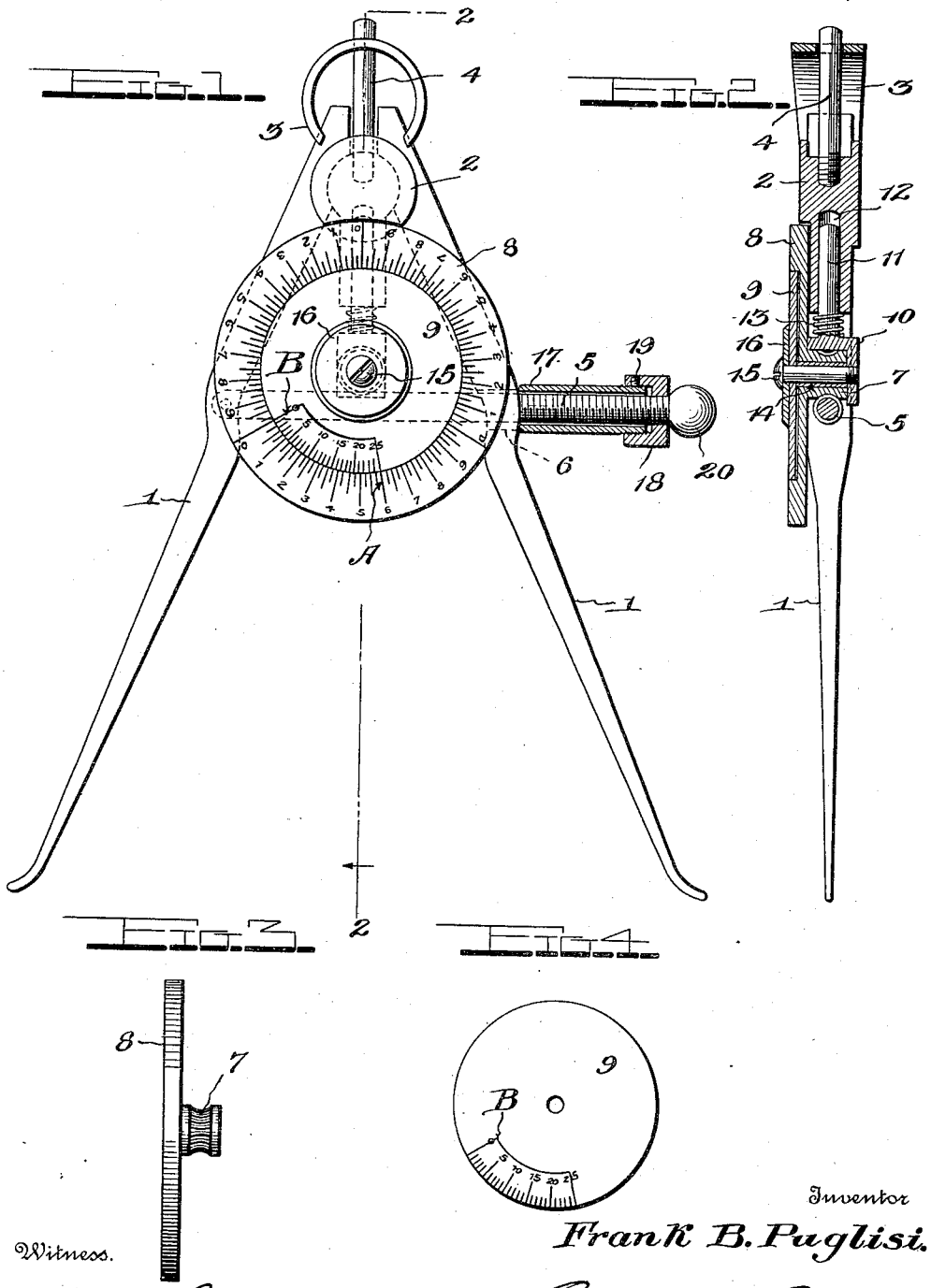

FRANK B. PUGLISI, OF NEW BRUNSWICK, NEW JERSEY.

ROTARY VERNIER-CALIPERS.

1,219,149.

Specification of Letters Patent.

Patented Mar. 13, 1917.

Application filed April 18, 1916. Serial No. 91,949.

*To all whom it may concern:*

Be it known that I, FRANK B. PUGLISI, subject of the King of Italy, residing at New Brunswick, in the county of Middlesex and State of New Jersey, have invented certain new and useful Improvements in Rotary Vernier-Calipers, of which the following is a specification.

This invention relates to a rotary vernier caliper adapted for outside and inside work, and for all other purposes for which the combination of a pair of calipers and a vernier would be employed.

The invention consists in providing a pair of calipers of the usual construction with fixed and movable coöperating vernier scales in conjunction with a worm gear and worm shaft for operating the movable member of the combination.

The invention further consists in the novel features of construction hereinafter described, pointed out in the claims, and shown in the accompanying drawings, in which:—

Figure 1 is a front view partly in section.

Fig. 2 is a section on the line 2—2 of Fig. 1.

Fig. 3 is an edge view of the outside or rotatable vernier disk.

Fig. 4 is a front view of the inner disk.

In the drawings 1 represents the legs of a caliper of the usual construction, having the joint 2, spring 3, and pin 4, all in common use.

Pivotally connected to one of the caliper legs is a worm shaft 5 which works or swings in a suitable slot 6 formed in the other caliper leg.

A suitable worm gear 7 having twenty-one teeth is adapted to mesh with the shaft 5, and said gear carries a vernier disk 8, which will be referred to as the outside disk.

An inner disk 9 is set into the front face of the disk 8, as shown in Figs. 1 and 2. To secure these parts in position I employ a fork having an angled portion 10 and a pin 11. The pin works in a recess formed in the caliper head, as at 12, and about it is coiled a spring 13 that bears on the head or joint portion of the caliper and on the portion 10 of the fork. A bushing 14 is fitted in the bore of the worm wheel 7, one end of the bushing bearing on the fork portion 10 and the other end resting against the inner face of the disk 9. A screw 15 passes through the disk 9 and bushing 14 and threads into the fork 10, and is provided with a suitable washer 16 which bears on the outer face of the disk 9. The disk 9 is clamped tightly between said washer and the end of the bushing, and held against rotation while the worm gear 7 and disk 8 rotate on the bushing as a bearing.

What may be termed the exterior portion of the worm shaft, that is the portion projecting outwardly through the slot 6 carries a sleeve 17 and a cup-nut 19, said nut working on the shaft and also overlapping the outer end of the sleeve to which it is secured by a set screw 19.

By loosening said screw and turning the nut, the threads of which engage suitable threads on the sleeve, the sleeve will be either drawn farther into the nut and therefore away from the caliper leg, or pushed outwardly, in either case properly adjusting the worm shaft and spacing the head 20 of the shaft from the caliper leg.

By means of this very fine and accurate adjustment is readily obtained.

The disk 8 is provided with a vernier scale A formed by dividing said disk into three equal portions and then each of these is subdivided into forty parts.

One rotation of the gear 7 gives of course a complete rotation of the disk 8, said disk rotating once for each three inch opening of the caliper legs, or a movement of one inch toward or away from each other of the caliper points for each one third rotation of the disk 8.

The disk 9 is divided also into thirds, and then on one of these subdivisions, not shown, is laid off the scale B, said scale having a length equal to twenty-four of the forty parts of one third of the scale A, and this portion of the disk 9 is then subdivided into twenty-five parts.

By means of the device above described very fine and accurate measurements can be quickly and easily determined.

What I claim is:—

1. The combination with a pair of calipers, of a rotary vernier carried thereby, a worm gear having twenty-one teeth carried by the vernier disk, and a worm shaft adapted to engage said worm gear.

2. The combination with a caliper, of a vernier disk carried thereby, a worm gear secured to said disk, and a worm shaft pivoted to one of the caliper legs and adapted to be held in engagement with said worm gear.

3. In a device of the kind described, caliper legs, a worm gear mounted between said legs, a vernier disk carried by said gear, one of said legs being slotted, and a worm shaft pivoted to the non-slotted leg and working in the slot of the other leg, and engaging said gear.

4. In a device of the kind described, caliper legs, a fork loosely carried by the leg joint, a worm gear carried by said fork, a worm shaft adapted to mesh with said gear, a disk carried by the gear and having a vernier scale thereon, and a second disk set into the face of the first mentioned disk and held against rotation, said second disk having a coöperating scale thereon.

5. The combination with a pair of calipers, a fixed and a rotary vernier disk carried thereby, a worm gear carried by the rotary disk, a worm shaft adapted to engage said gear, said shaft working loosely through one of the caliper legs and having a head at its outer end, and means carried by the shaft for spacing said head from said caliper leg.

6. The combination with a pair of calipers, of a fixed and rotatable disk carried thereby, the fixed disk being superposed on the rotatable disk and of less diameter, a worm gear carried by the rotatable disk, a worm shaft pivotally carried by one of the caliper legs and working loosely through the other, and engaging said gear, and adjustable means carried by the projecting portion of the shaft for spacing the outer end of the shaft from the last mentioned caliper leg.

In testimony whereof I affix my signature.

FRANK B. PUGLISI.

Copies of this patent may be obtained for five cents each, by addressing the "Commissioner of Patents, Washington, D. C."